United States Patent Office 3,159,252
Patented Dec. 1, 1964

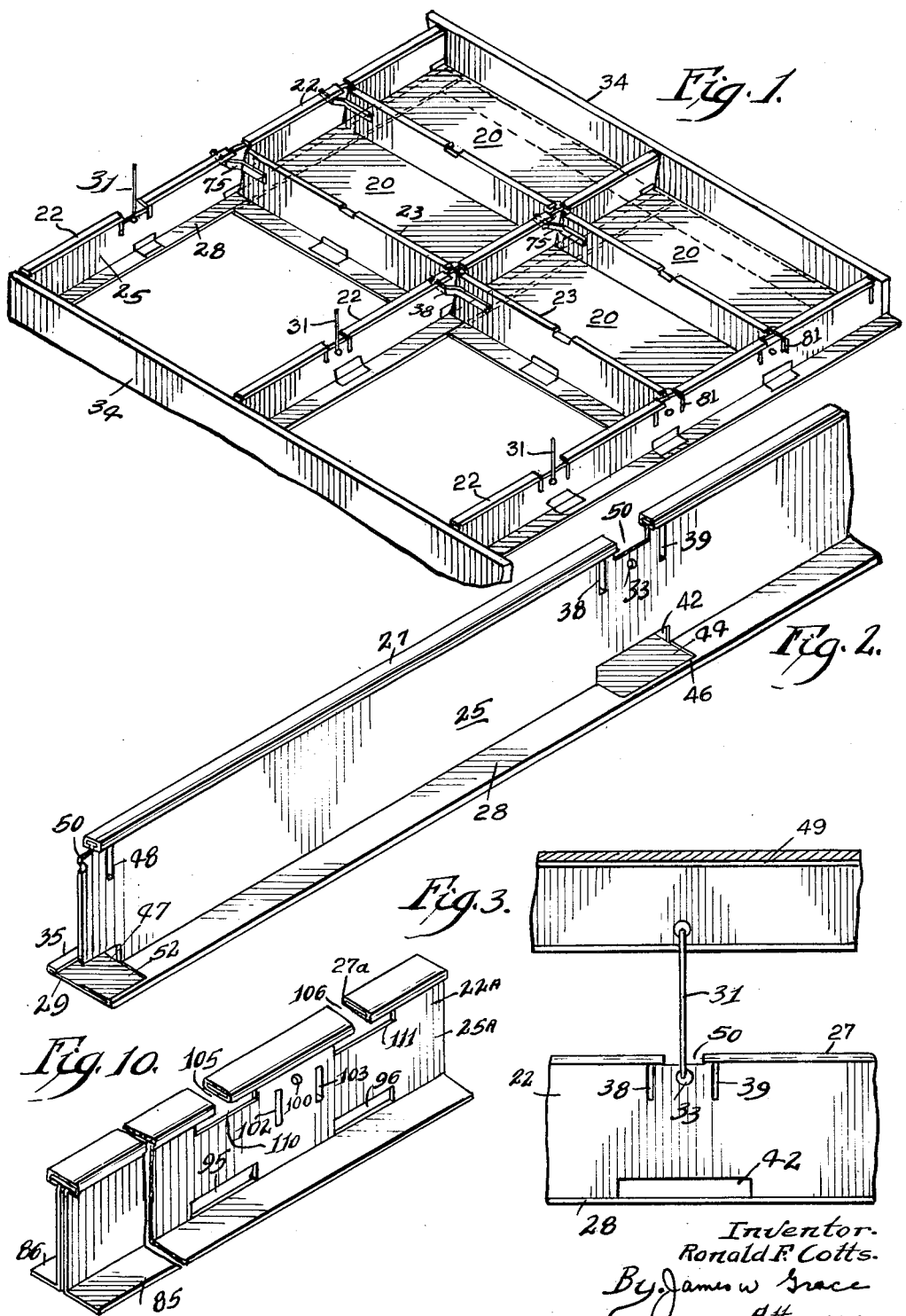

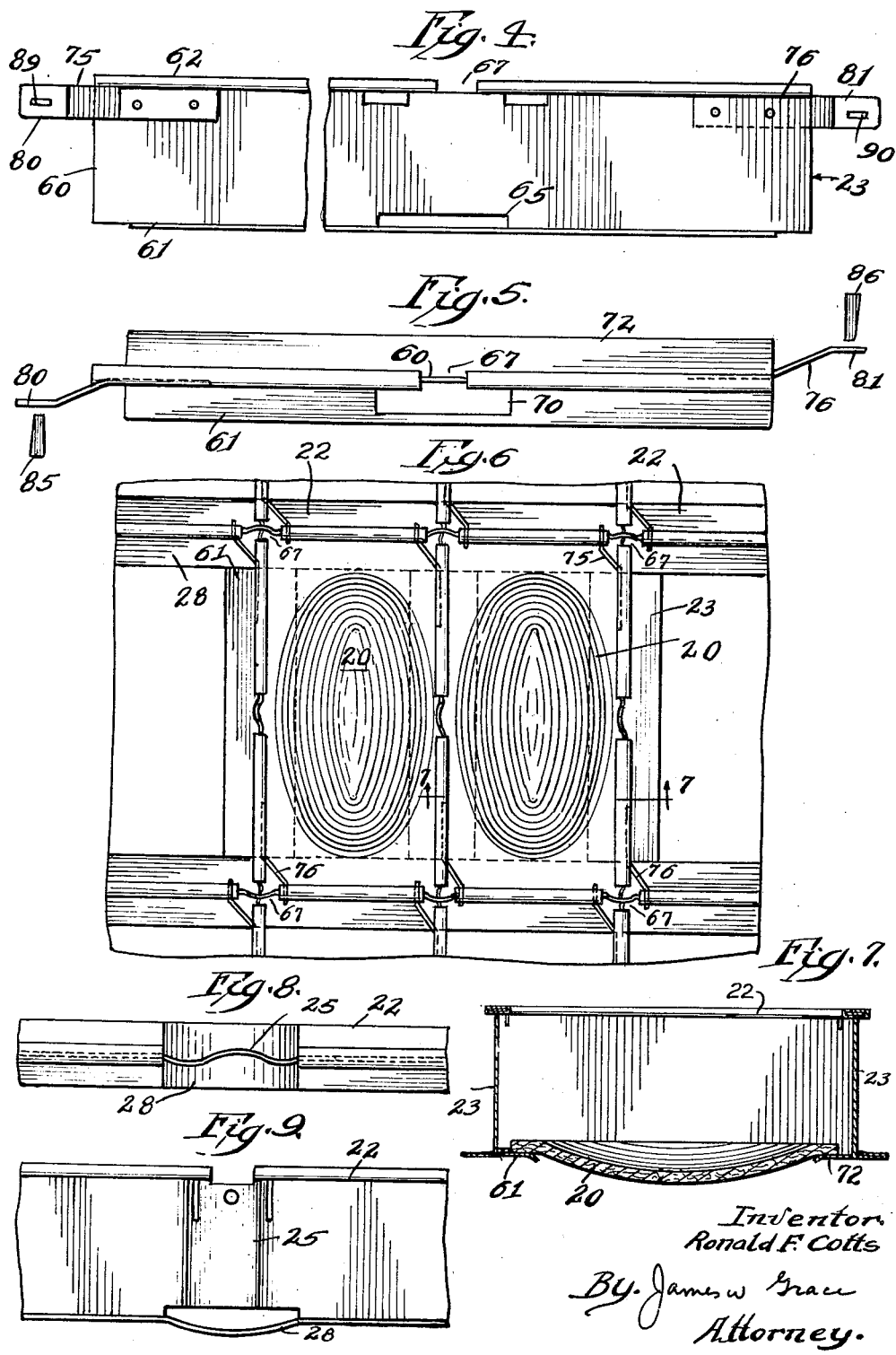

3,159,252
FIRE RETARDANT CEILING SUSPENSION SYSTEM
Ronald F. Cotts, Evanston, Ill., assignor, by mesne assignments, to The Celotex Company, Chicago, Ill., a corporation of Delaware
Filed May 25, 1961, Ser. No. 112,585
4 Claims. (Cl. 189—85)

This invention pertains to a ceiling suspension system, and more particularly to a ceiling suspension system which remains in place without failure under high temperature conditions, such as those occurring during a fire.

Ceilings, such as those suspended in position for enhanced sound and noise absorption, must be of such stability as not to permit passage of excessive heat therethrough during a fire in the room in which they are installed. Presently, the Underwriters Laboratories have rated ceiling systems as having one hour, two hours, or more, fire retardant characteristics. The ceiling systems ratings are determined by means of the fire endurance tests conducted in accordance with the Standard for Fire Tests of Building Construction and Materials, UL263 (ASTM E119, NFPA 251). This means that a ceiling system, both the individual sound absorbing panels or tiles and the suspension members, must remain in place and prevent transmission of excessive amounts of hot gases, flame and heat, from reaching the area above the ceiling for a predetermined period of time.

Conventional metal ceiling suspension systems tend to rupture and distort during the fire tests, and thus do not possess the requisite stability to pass the rigid fire tests. Even though the individual sound absorbing panels may not crumble or be destroyed during a fire test, it is necessary that the ceiling suspension system itself does not warp or distort to such an extent that the acoustical panels can fall out of the ceiling. The prevention of the distortion of the suspension system is important because the individual acoustical tiles tend to shrink laterally, and a distortion of the suspension system is likely to permit some of the tiles to fall out of the ceiling. In effect, the ceiling system acts as a membrane to bar or stop the heat, flame, and hot gases from reaching the area above the ceiling. The ceiling system also acts as a thermal insulator.

In order to be successful, a suspension system must be economically competitive. A system constructed entirely of short suspension members may provide the requisite protection against ceiling failure, but becomes economically unfeasible to install because of high labor costs. In addition, a suspension system utilizing numerous short members requires an excessive number of individual expansion joints.

Other ceiling suspension systems have been proposed which rely upon parts which slide relative to each other to compensate for thermal expansion of the metal suspension system elements. Still others provide fusible links which melt out of the system and permit expansion of the suspension elements or relative movement thereof.

It is an object of this invention to provide a novel ceiling suspension system which can withstand intense heat without distortion that permits the transmission of hot gases.

It is another object of this invention to provide a novel ceiling suspension system which is economical to install and simple to fabricate.

It is yet another object of the present invention to provide a novel ceiling suspension system in which each of the individual suspension members is constructed of a unitary piece of sheet metal.

It is a further object of the present invention to provide a novel system which does not require relative sliding action between parts of the main suspension system.

The solution of this problem, as achieved by the present invention, involves what might be termed "controlled buckling." "Controlled buckling" means the buckling of the suspension system such that the longer suspension members act as if they were shorter individual suspension members, and the shorter cross suspension members do not force the longer members out of position.

These and other objects and advantages of the present invention will become more apparent when considered in connection with the description of the accompanying drawings, in which like numerals indicate like elements and in which:

FIGURE 1 is a perspective view of the upper side of a suspended ceiling showing suspension members and ceiling panels in place;

FIGURE 2 is an expanded perspective view of one of the main suspension members of FIGURE 1;

FIGURE 3 is a side elevation of a portion of a main suspension member showing its support in detail;

FIGURE 4 is a side elevation of a cross-suspension member;

FIGURE 5 is a top elevational view of the cross-suspension member shown in FIGURE 4;

FIGURE 6 is a top elevational view of one portion of the suspended ceiling shown during a fire;

FIGURE 7 is a side elevational view of the portion of the suspended ceiling taken along line 7—7 of FIGURE 6;

FIGURE 8 is a top elevational view of a short portion of a main suspension member showing its buckled condition;

FIGURE 9 is a side elevational view showing the buckled main suspension member of FIGURE 8; and FIGURE 10 is a perspective view of an alternative form of main suspension member.

A detailed discussion of the present invention may be best understood with reference to the accompanying drawings, in which FIGURE 1 illustrates a portion of a ceiling having acoustical panels 20, each supported under its four peripheral edges by main suspension members 22 and cross-suspension members 23. The panels 20 may be in various sizes. As shown, they are rectangular solids 2 feet wide by 4 feet long and about ⅝" thick. For convenience, they may be 2 feet wide by 2 feet long and about ⅝" thick. Panels 20 are made of a combination of mineral wool with a suitable binder, and are capable of remaining intact even at temperatures up to about 2000° F. for periods exceeding one hour. A suitable acoustical panel 20 is manufactured by The Celotex Corporation of Chicago, Illinois, and sold under the trademark "Protectone."

The main suspension members 22 may be of any length, but are preferably 12 feet long. For convenience, however, main suspension members, as illustrated, are 8 feet long. Members 22 comprise an upstanding web portion 25, a top bead 27, and flanges 28 and 29 extending outwardly on opposite sides of web portion 25 and perpendicular thereto. The main suspension member 22 is made of an integral piece of sheet metal with the top bead 27 and the flanges 28 and 29 formed by bending a flat piece of metal stock of about .025" thickness by suitable forming operations. Top bead 27, although shown with a particular configuration, may be of any suitable shape to act as a reinforcing member along the top of the suspension member 22. Main suspension member 22 is about 1½" in height from the bottom of flanges 28 and 29 to the top of bead 27. The main suspension members 22 are secured to an overhead support (not shown) by wires 31. In installation, the wires 31 are secured through holes 33 in the web 25 of member 22 and then to the overhead support. The members 22 are spaced four feet apart between their longitudinal centerlines and levelled so that flanges 28 and 29 of each member 22 lie in the same horizontal plane.

The room in which the ceiling suspension system is installed has sidewalls 34 against which the ends of main suspension members 22 abut and are held tightly in place. Thus, the main suspension members 22 are constrained against longitudinal expansion by sidewalls 34.

For a more detailed discussion of the main suspension members 22, reference may be had to FIGURES 2 and 3. In the manufacture of main suspension member 22 it should be noted that flange 28 is of double thickness because in its manufacture, the top member of the flange is first formed by bending the web 25 outwardly at right angles and then folding the extending piece under and beyond web 25 to form flange 29. To give additional rigidity to flange 29, a small section thereof 35 is folded back along its length. At intervals of about two feet, web 25 has a pair of slots 38 and 39 cut therein for the reception of extending fingers supporting cross-suspension members 23. Slots 38 and 39 are narrow but elongated in a direction transverse to the longitudinal dimension of web 25. Slots 38 and 39 are symmetrically located with respect to hole 33 which is drilled slightly below the upper edge of web 25. At the lower edge of web 25 there is cut a slot 42 which may, for convenience, be about two inches long and about one-quarter to one-half inch in height. Flange 28 is integral and coextensive with web 25 along its lower edge except for that portion underlying slot 42. An additional cutout portion 44 is made in the upper portion of flange 28, leaving a thin strengthening portion 46 near the outer edge of flange 28. This strengthening portion 46 is the same width as section 35 so that the flanges 28 and 29 are similar in rigidity at this area. In order to provide for the expansion of bead 27, a slot 50, about ¼ inch in length and substantially in registration with slot 42, is provided. As shown in FIGURE 3, main suspension member 22 is hung from an overhead joist 49 by wire hanger 31.

It will be recalled that flange 28 is of double thickness because of the manufacturing process, and therefore slot 44 is cut therein so that the relative strengths of flanges 28 and 29 in this area are equal. It will also be recalled that the main suspension member 22 is about 12 feet in length, although shown as 8 feet long, and therefore the groups of slots 38, 39, 42 and 44 are placed at equi-spaced intervals of about 2 feet, 4 feet, 6 feet, 8 feet and 10 feet from one end of the main suspension member 22. The spacing of the groups of slots is determined by the dimensions of the acoustical tile or panels 20 to be used. For panels 2 feet along the main suspension system, the spacing is 2 feet; for panels 4 feet along the main suspension system, the spacing may be 4 feet, if desired. Member 22, at each end, is slotted in a manner similar to that in its center but has only one slot 47 in web 25 and slots 50 and 52 which are about one-half the length of slots 42 and 44. The corresponding main suspension member 22, which is attached in spaced alignment with suspension member 22, has corresponding slots therein.

The cross suspension members 23 are shown in greater detail in FIGURES 4 and 5. FIGURE 4 shows member 23 in side elevation having a web portion 60 and flange 61 extending at right angles outwardly therefrom. Member 23 is of sheet stock similar to that of main suspension member 22. Top bead 62 provides for strengthening the upper portion of the cross member. Since the span of cross members 23, as shown in FIGURE 1, are four feet in length, it has been found desirable to provide for buckling at the central portion of the span. For this reason a slot 65 corresponding to slot 42 in the main suspension member 22 is provided in web 60. Flange 61 is integral and coextensive with web 60 along its lower edge except for that portion underlying slot 65. Additionally, the top bead 62 has a cutout portion 67 located immediately above and in registration with slot 65. As shown in FIGURE 5, flange 61, which is a double thickness flange in the manner of flange 28 of the main suspension member 22, is also slotted as at 70. As can be seen in FIGURE 5, a single thickness flange 72 extends outwardly from the web 60 in a direction opposite that of flange 61. It should be noted that flanges 61 and 72 are recessed from the transverse edges of web 60. This is done so that in assembly, the flanges 61 and 72 are coplanar with flanges 28 and 29 of the main suspension members 22 while the transverse edges of web 60 abut the web 25 of the main suspension member 22.

In order to secure cross suspension member 23 in proper alignment with the main suspension members 22, outwardly extending fingers 75 and 76 are attached to the upper portion of web 60 and extend outwardly. As can be easily seen, fingers 75 and 76 have slightly offset ends 80 and 81.

Referring now to FIGURE 1, it will be noted that end 80 of finger 75 is inserted into slot 38 of one main runner, while the end 81 of finger 76 is inserted into slot 39 of the next adjacently spaced, parallel main suspension member 22.

In order to firmly secure the cross suspension member 23 in place, wedges 85 and 86 may be forced into slots 89 and 90, respectively, after assembly of the suspension system.

In installation, the main suspension members 22 are secured in position and aligned in their proper horizontal and vertical planes. Cross suspension members 23 are then placed in position and locked in place. Following the assembly of the suspension system, the individual panels 20 are inserted.

The operation of the unique suspension system of the present invention may be best understood with reference to FIGURES 6–9, which show in detail the system during and after the application of intense heat. In tests actually conducted, the ceiling suspension system is placed in a furnace and suspended in the manner illustrated in FIGURE 1. The furnace was then heated to a temperature of about 2000° F. in the area below the ceiling. The individual acoustical panels 20 were found to bow downwardly with the maximum amount of displacement at their centers. As may be seen in FIGURES 6 and 7, the panels 20 shrunk slightly in length and width. However, the amount of shrinkage was not sufficient to cause an opening between the flanges 28, 29, 61, and 72, upon which they rested.

The main suspension members 22 expanded lengthwise, but because they were constrained at their ends they buckled at the areas of slots 50, 42 and 44. As may be seen more clearly in FIGURES 8 and 9, the web portion 25 bowed out of the vertical plane to compensate for the expansion along the length of main suspension member 22. Simultaneously, the flange portions 28 and 29 bowed downwardly to permit expansion of the lower flange portions of main suspension member 22. Thus, while main suspension member 22 expanded in length, the controlled buckling thereof at points intermediate its length permitted the remainder of the main suspension member to remain virtually in the same vertical and horizontal planes in which it was originally installed. Because slot 42 is cut into web 25, the flanges 28 and 29 may bow either upwardly or downwardly. It is apparent that if the flanges would invariably bow downwardly, only a thin slot could be used. However, as there is the possibility of upward bowing, it has been found desirable to make slot 42 of sufficient depth to accommodate the amount of upward bowing which may occur. It is obvious that unless the controlled buckling of intermediate sections of the main runner were permitted, the entire runner would have been distorted. This distortion could well permit tile 20 to fall through, and thus destroy the integrity of the ceiling.

Simultaneously, the shorter suspension members 23 buckled in much the same manner of their mid points to again permit the controlled buckling, so that the major portion of suspension members 23 remain in the same vertical and horizontal planes in which they were originally suspended.

The suspension member 22 shown in FIGURES 1–3 is of unbalanced construction, wherein flange 28 is composed of a double thickness of metal as compared to flange 29. FIGURE 10 illustrates an alternative form of main suspension member 22a in which the member is of balanced construction. It may be seen that the web portion 25a of suspension member 22a comprises a double web having two depending walls of metal with flanges 85 and 86 extending outwardly from the web portion 25a. In this construction, since there is no double thickness of either flange 85 or 86, the extending flange portions need not have slots cut therein corresponding to slots 44 of main runner 22 shown in FIGURES 1 and 2. FIGURE 10 is further modified by cutting a pair of slots 95 and 96 located in the lower edge of the two walls of web 25a on each side of a central suspension hole 100. Elongated slots 102 and 103 are provided for the reception of fingers of cross suspension members in the manner previously described. Upper bead 27a is provided with a pair of cutouts 105 and 106 to permit expansion of the bead without undue distortion. It should be noted that web 25a is cut with slots 110 and 111 immediately below cutouts 105 and 106 of bead 27. The reduced height of web 25a caused by the cutouts 95, 96, 110 and 111, permit it to buckle more readily upon the application of heat.

In summary, the present invention is directed to a novel suspension system having unusual properties of stability under conditions of extreme heat. The individual suspension members are so constructed that they buckle at predetermined spaced points so that the linear expansion of the metal does not cause the suspension members to depart from thier preset positions in the vertical planes in which they are installed. The system is adaptable to acoustical panels of various dimensions, and is of the universal type so that uniform parts may be used throughout the ceiling. In addition, both balanced and unbalanced types of construction have been illustrated.

While there has been set forth herein the best mode of the invention known to the applicant, certain rearrangements, changes, and alterations will occur to those skilled in the art, and it is intended that such rearrangements, changes, and alterations be included within the scope of the accompanying claims.

I claim:

1. A suspension member for a ceiling suspension system comprising an elongated central web portion having a slot in its lower edge intermediate its ends, a discontinuous reinforcing bead extending integrally with said web portion along the top edge thereof, said discontinuity being in registration with said slot in said web portion, and a pair of flanges extending transversely to said web portion, one of said flanges being formed of two sheets folded one over the other, the upper one of said sheets having a slot therein in registration with said slot in said web portion, the remaining length of said upper one of said sheets being integrally connected to and along the lower edge of said web portion, and the other of said flanges being a planar extension of said lower one of said two sheets.

2. A cross-suspension member for a ceiling suspension system for use with a main suspension member, said main suspension member having outwardly extending flanges along its lower edge, said cross-suspension member comprising an elongated web portion having a slot in its lower edge intermediate its ends, a discontinuous reinforcing bead extending integrally with said web portion along the top edge thereof, said discontinuity being in registration with said slot in said web portion, a flange extending transversely to said web portion, and being integrally connected to and along the lower edge thereof except for that portion of said flange underlying said slot in said web portion, said flange being shorter than said web portion of said cross-suspension member at each end thereof by an amount equal to the transverse length of said flange of said main suspension member, said cross-suspension member further having a pair of fingers each connected to said web portion and extending outwardly longitudinally thereof at respective ends thereof.

3. A ceiling suspension system in the form of a grid comprising uniformly spaced main suspension members, means for suspending said main suspension members in spaced parallel relationship, each of said main suspension members comprising an elongated central web portion having a first slot in its lower edge intermediate its ends and a pair of elongated slots disposed transversely of the lengthwise dimension of said central web portion and symmetrically spaced with respect to the center point of said first slot, a discontinuous reinforcing bead extending integrally with said web portion along the top edge thereof, said discontinuity being between said spaced elongated slots, and a flange extending transversely to said web portion and being integrally connected to and along the lower edge thereof except for that portion of said flange underlying said first slot in said web portion, and cross-suspension members connected transversely to said main suspension members, said cross-suspension member having fingers extending outwardly at each end thereof entering into respective ones of said elongated slots.

4. A ceiling suspension system in the form of a grid comprising uniformly spaced main suspension members, means for suspending said main suspension members in spaced parallel relationship, each of said main suspension members comprising an elongated central web portion having a first slot in its lower edge intermediate its ends and a pair of elongated slots disposed transversely of the lengthwise dimension of said central web portion and symmetrically spaced with respect to the center point of said first slot, a discontinuous reinforcing bead extending integrally with said web portion along the top edge thereof, said discontinutiy being between said spaced elongated slots, and a flange extending transversely to said web portion and being integrally connected to and along the lower edge thereof except for that portion of said flange underlying said first slot in said web portion, cross-suspension members connected transversely to said main suspension members, each of said cross-suspension members comprising an elongated web portion having a slot in its lower edge intermediate its ends, a discontinuous reinforcing bead extending integrally with said web portion of said cross-suspension member along the top edge thereof, said discontinuity being in registration with said slot in said web portion of said cross-suspension member, a flange extending transversely to said web portion of said cross-suspension member and being integrally connected to and along the lower edge thereof except for that portion of said flange underlying said slot in said web portion of said cross-suspension member, said flange being shorter than said web portion of said cross-suspension member at each end thereof by an amount equal to the transverse length of said flange of said main suspension member, said cross-suspension member, further having a pair of fingers, each connected thereto and extending outwardly longitudinally thereof at respective ends thereof, the fingers being positioned and locked in place in respective ones of said elongated slots of said main suspension members, and incombustible panels placed within areas formed by said grid and resting upon the said transverse flanges of said main and cross-suspension members.

References Cited in the file of this patent

UNITED STATES PATENTS 2,689,630    Drury _____ Sept. 21, 1954

FOREIGN PATENTS 755,104    Great Britain _____ Aug. 15, 1956